Nov. 11, 1930.   S. O. BONDESON   1,781,047
EDUCATIONAL DEVICE
Filed May 31, 1929

INVENTOR
Selma O. Bondeson
BY
J. R. Rivers
ATTORNEY

Patented Nov. 11, 1930

1,781,047

UNITED STATES PATENT OFFICE

SELMA O. BONDESON, OF SEATTLE, WASHINGTON

EDUCATIONAL DEVICE

Application filed May 31, 1929. Serial No. 367,334.

This invention has reference to improvements in devices for testing students in arithmetical or other problems, and its objects, generally stated, are—

To provide an envelope having a plurality of openings and carrying test problems adjacent thereto, the answers to said problems to be written by a student through said openings and on to a sheet of paper enclosed in the envelope, a sheet of cardboard being disposed in the envelope and back of the sheet of paper to afford an adequate writing surface for the paper and also to facilitate its placement in or removal from the envelope;

To provide a device capable of enclosing and holding in alignment a plurality of sheets of paper so that it may be made available for testing a number of students in said problems, the sheets containing the completed tests being progressively placed back of the other and unwritten sheets of paper and thereby presenting rearwardly of said openings an unwritten sheet for another test, until the supply of unwritten sheets in the envelope is exhausted; and, To provide a key envelope, having similar openings and adjacent thereto answers to said problems, into which the first-named envelope containing the completed tests may be slipped and from which the instructor by comparison may readily correct said tests, the key envelope serving to conceal the name of each student from the instructor while the examination of said tests is being made, and the key envelope—designed to be kept at all times in the custody of the instructor—rendering the prepared answers to the problems inaccessible to the students.

In the accompanying drawing—

Figure 1:
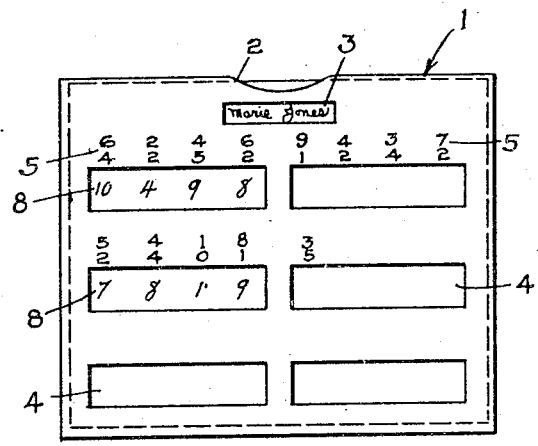
Figure 1 is a plan view of the envelope of said device carrying a cardboard backing sheet and writing sheets, designed to be utilized by students in making tests, certain problems and answers thereto being indicated.

Referring more particularly to the drawing, 1 denotes generally an envelope open at the top and provided preferably with a recessed portion 2 on each side, to facilitate the removal of sheets from the envelope. Each side of the envelope is identical in outline and is provided in the embodiment shown with a rectangular opening 3 disposed centrally and adjacent the top, and a plurality of rectangular openings 4, the openings on the respective sides being in alignment.

Figure 2:
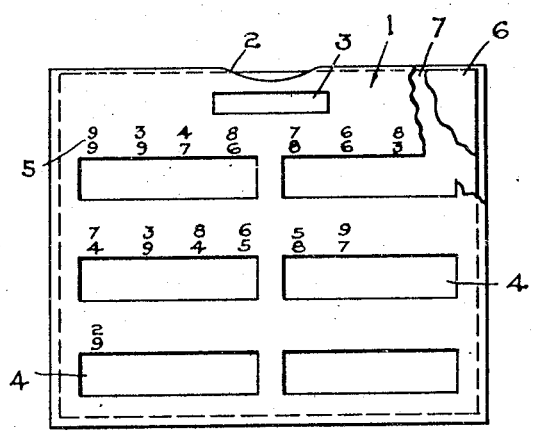
Fig. 2 is a like view of the reverse side of same, portions being broken away to indicate said sheets enclosed by the envelope.

The problems to be solved are designed to be placed above and adjacent to each of the openings 4, a few elementary problems in arithmetic, denoted as 5, being shown in Figs. 1 and 2 as illustrative of the manner in which these or other problems will appear to the student when using the device. A backing sheet of cardboard 6 and a plurality of sheets of writing paper 7 placed thereon are enclosed within the envelope, said sheets being of a size which will permit them to fit the envelope and also to be easily slid therein. When inserting said sheets in the envelope, the backing sheet is advantageous in that it affords means somewhat rigid for passing the openings in the envelope which are contiguous to the backing sheet, thereby permitting the writing sheets to be slipped into the envelope in a manner more facile, as is evident, than would be possible if the writing sheets were installed without being thus reenforced, in view of the usual flexibility of such sheets. When the sheets are operatively disposed in said envelope, the outer one of the writing sheets is located back of said openings, as shown in Fig. 1, and the backing sheet is disposed rearwardly of the writing sheets and against the similar openings in the reverse side of the envelope. These portions of the device, assembled as described, afford the means whereby a number of students may make tests in accordance with my invention.

In accomplishing this purpose, the name of the student making the test is first written on that part of the blank sheet exposed through the opening 3. Each problem appearing on one side of the envelope is taken up in order and the answer to each, designated as 8, is written on said sheet exposed through the adjacent opening 4 and immediately under the problem, as indicated in Fig. 1. When the answers to all of said problems have been thus written on said sheet, the sheet is taken from the envelope and then inserted therein back of the unwritten sheets, the same being disposed right side up with the writing facing toward said openings, and leaving, obviously, a blank sheet exposed by the openings. The envelope and contents are now in condition to be taken up by another student for making a test in the same manner, and by repeating the cycle of operations described the same may be made available to a number of students for test purposes, said number being limited only by the quantity of writing sheets installed in the envelope.

Figure 3:
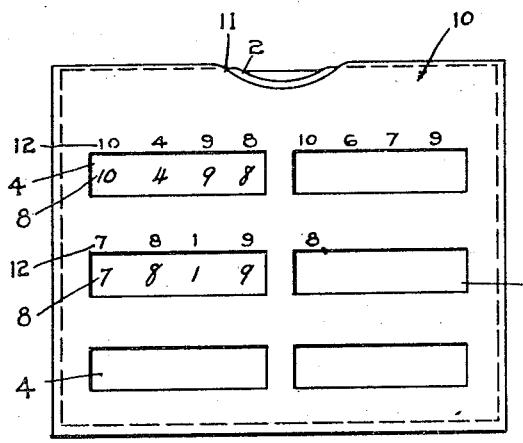
Fig. 3 is a plan view of the key envelope used by the instructor in examining said tests, the first-named envelope and contents being enclosed therein.
Figure 4:
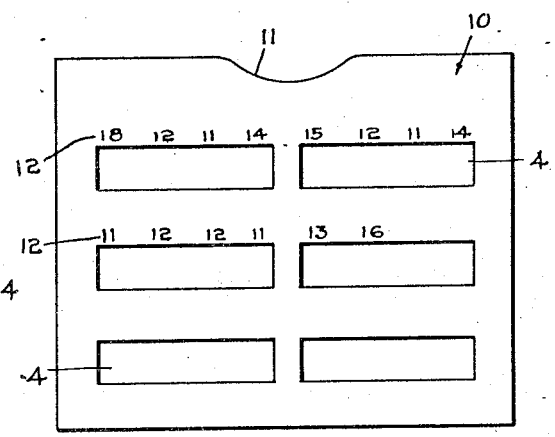
Fig. 4 is a plan view of the reverse side of the key envelope.

After the tests have been completed and the instructor desires to examine them, said envelope and contents are placed in a key envelope. The key envelope, denoted generally as 10, is almost identical in construction with the first-named envelope, however, it is slightly larger in size to accommodate the envelope containing the tests, and it is provided on each side with recessed portions 11 somewhat larger than the recessed portions 2 so as to enable the user to more readily grasp the first-named envelope in withdrawing it from the key envelope. It is also provided on each side with a plurality of openings 4 adapted to register with the like openings 4 in the first-named envelope, and having answers 12 to said problems disposed directly thereabove. As it may be noted, when the first-named envelope and contents are placed in the key envelope as shown in Fig. 3, the answers to the problems as made by a student appear below the correct answers shown on the key envelope, and the instructor can at once determine if the answers of the student correspond therewith, and mark any of those which may be incorrect. After the first sheet is examined it is withdrawn from its enclosing envelope, said sheet then being identified by the name of the student written thereon. Another written sheet will then be presented for examination, and it and subsequent sheets may be handled in the same manner until all the written sheets therein are examined. One key envelope may be used in correcting tests enclosed in a number of envelopes, should it be deemed expedient to utilize a plurality of envelopes and sheets assembled therein for working a set of problems.

This invention is effective when using envelopes having openings on one side only through which answers to problems may be written or observed, but in providing openings for each side of the envelopes, the capacity of each envelope is thereby doubled as relates to the presentation of problems and answers thereto, one of them having two sets of problems and the other having answers to each of said sets.

In addition to the functions heretofore ascribed to the backing sheet in detail, after it is once installed in its envelope, it provides a smooth surface on one side of and interiorly of the envelope over which to insert more writing sheets when the initial supply has been used. In a like manner it also facilitates the replacing of the sheets in said envelope after the answers to the problems have been written thereon by the students.

I claim:

1. A device of the class described, comprising an envelope provided on each of its sides with a plurality of openings, a test problem disposed adjacent each opening, a plurality of writing sheets enclosed in the envelope, adapted to be successively exposed through said openings for receiving answers to said problems, a backing sheet of relatively stiff material disposed in the envelope and on one side of the writing sheets, and a key envelope adapted to enclose the first-named envelope and contents, said key envelope having on each side a plurality of openings registrable with said openings in the first-named envelope, and an answer to each test problem disposed adjacent each of the openings in the key envelope.

2. A device of the class described, comprising an envelope provided with a plurality of openings, a test problem disposed above and adjacent each opening, a plurality of loose blank sheets enclosed in the envelope for receiving answers to said problems made through said openings as the sheets are successively exposed by said openings, a key envelope for enclosing the first-named envelope and contents, said key envelope having a plurality of openings adapted to register with the first-named openings, and a correct answer to each test problem disposed adjacent each of the second-named openings.

3. In an educational device having means for receiving answers to certain test problems in predetermined positions on a plurality of sheets of loose paper, a key-envelope for enclosing said sheets, said envelope having a plurality of windows adapted to expose said answers as said sheets are progressively brought to said windows, and a solution to each of said problems on said envelope and disposed adjacent the window exposing the answered problem to which the solution refers.

SELMA O. BONDESON.